(12) United States Patent
Chen

(10) Patent No.: US 7,720,801 B2
(45) Date of Patent: May 18, 2010

(54) SYSTEM AND METHOD FOR SUPPORTING ASYNCHRONOUS DATA REPLICATION WITH VERY SHORT UPDATE INTERVALS

(75) Inventor: Raymond C. Chen, Campbell, CA (US)

(73) Assignee: NetApp, Inc., Sunnyvale, CA (US)

( * ) Notice: Subject to any disclaimer, the term of this patent is extended or adjusted under 35 U.S.C. 154(b) by 232 days.

(21) Appl. No.: 11/015,916

(22) Filed: Dec. 17, 2004

(65) Prior Publication Data
US 2005/0144202 A1 Jun. 30, 2005

Related U.S. Application Data

(60) Provisional application No. 60/531,544, filed on Dec. 19, 2003.

(51) Int. Cl.
*G06F 17/30* (2006.01)
(52) U.S. Cl. ............... 707/204; 707/201; 707/202; 707/203; 707/100; 709/213; 709/220; 709/248; 718/100
(58) Field of Classification Search ............ 707/100, 707/203–204, 201, 202; 709/213, 220, 248; 718/100
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |

(Continued)

FOREIGN PATENT DOCUMENTS

WO    WO 89/10594    11/1989

(Continued)

OTHER PUBLICATIONS

Administration Guide found at http://www.openafs.org/pages/doc/AdminGuide/auagd010.htm, visited on Mar. 2, 2005.

(Continued)

*Primary Examiner*—Isaac M Woo
*Assistant Examiner*—Syling Yen
(74) *Attorney, Agent, or Firm*—Cesari and McKenna, LLP

(57) ABSTRACT

A system and method for improving the efficiency of the transmission of updated blocks generated by logging all the block allocations and deletes as well as CPs and PCPI creation and deletion in a persistent log. The log is scanned during each update cycle (in which changes are transmitted to a destination mirror) by the storage operating system, and only changed blocks that are referenced by the file system as it existed at the end of the update cycle or referenced by PCPIs that existed at the end of the update cycle are actually sent in the transmission. This reduces the number of changes being transmitted.

35 Claims, 12 Drawing Sheets

U.S. PATENT DOCUMENTS

| | | | |
|---|---|---|---|
| 4,989,206 | A | 1/1991 | Dunphy, Jr. et al. |
| 5,124,987 | A | 6/1992 | Milligan et al. |
| RE34,100 | E | 10/1992 | Hartness |
| 5,155,835 | A | 10/1992 | Belsan |
| 5,163,131 | A | 11/1992 | Row et al. |
| 5,202,979 | A | 4/1993 | Hillis et al. |
| 5,278,979 | A | 1/1994 | Foster et al. |
| 5,426,747 | A | 6/1995 | Weinreb et al. |
| 5,581,724 | A | 12/1996 | Belsan et al. |
| 5,706,509 | A * | 1/1998 | Man-Hak Tso ............. 707/201 |
| 5,819,292 | A | 10/1998 | Hitz et al. |
| 5,963,962 | A * | 10/1999 | Hitz et al. ................... 707/202 |
| 6,466,951 | B1 | 10/2002 | Birkler et al. |
| 6,567,811 | B1 * | 5/2003 | Edwards et al. ............. 707/100 |
| 6,574,591 | B1 | 6/2003 | Kleiman et al. |
| 6,604,118 | B2 | 8/2003 | Kleiman et al. |
| 6,636,879 | B1 | 10/2003 | Doucette et al. |
| 6,668,264 | B1 | 12/2003 | Patterson et al. |
| 6,801,940 | B1 * | 10/2004 | Moran et al. ................ 709/224 |
| 6,823,376 | B1 * | 11/2004 | George et al. ............... 709/221 |
| 6,889,228 | B1 | 5/2005 | Federwisch et al. |
| 6,915,316 | B1 | 7/2005 | Patterson et al. |
| 6,993,539 | B2 | 1/2006 | Federwisch et al. |
| 7,007,046 | B2 | 2/2006 | Manley et al. |
| 7,010,553 | B2 | 3/2006 | Chen et al. |
| 7,039,663 | B1 | 5/2006 | Federwisch et al. |
| 7,043,485 | B2 | 5/2006 | Manley et al. |
| 7,111,014 | B2 * | 9/2006 | Sawdon et al. ............. 707/102 |
| 7,111,021 | B1 * | 9/2006 | Lewis et al. ................. 707/202 |
| 7,162,662 | B1 * | 1/2007 | Svarcas et al. ................ 714/15 |
| 7,203,796 | B1 | 4/2007 | Muppalaneni et al. |
| 7,225,204 | B2 | 5/2007 | Manley et al. |
| 7,325,109 | B1 | 1/2008 | Muppalaneni et al. |
| 7,454,445 | B2 | 11/2008 | Lewis et al. |
| 2001/0044807 | A1 * | 11/2001 | Kleiman et al. ............. 707/203 |
| 2002/0010807 | A1 | 1/2002 | Multer et al. |
| 2002/0016827 | A1 * | 2/2002 | McCabe et al. ............. 709/213 |
| 2002/0038314 | A1 | 3/2002 | Thompson et al. |
| 2003/0182326 | A1 * | 9/2003 | Patterson .................... 707/204 |
| 2006/0179261 | A1 * | 8/2006 | Rajan ......................... 711/162 |
| 2006/0184587 | A1 | 8/2006 | Federwisch et al. |
| 2006/0218210 | A1 | 9/2006 | Sarma et al. |
| 2009/0006792 | A1 | 1/2009 | Federwisch et al. |
| 2009/0030983 | A1 | 1/2009 | Malaiyandi et al. |

FOREIGN PATENT DOCUMENTS

| | | |
|---|---|---|
| WO | WO 02/29573 A2 | 4/2002 |
| WO | WO 02/29573 A3 | 4/2002 |
| WO | WO 2005/064469 | 7/2005 |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing,* Proceedings of the 14$^{th}$ VLDB Conference, LA, CA (1988).

Blasgen, M.W. et al., *System R:An architectural Overview,*Reprinted from IBM Systems Journal vol. 20, No. 1, 1981 © 1981, 1999.

Borenstein, Nathaniel S., *CMU's Andrew project a retrospective,* Communications of ACM, (39)12, Dec. 1996.

Brown, Mark R. et al., *The Alpine file system,* ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system,* In Proceedings of the USENIX Winter 1992.

Clark, B.E., et al., *Application System /400 Performance Characteristics,* IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{article I have has no date or cite}.

Gait, Jason, *Phoenix: A Safe In-Memory File System.* Communications of the ACM, 33(1):81-86, Jan. 1990.

Hartman, John H. et al., *Performance Measurements of a Multiprocessor Sprite Kernel,* Proceedings of the USENIX Conference, 1990.

Hitz, Dave et al., *File System Design for an NFS File Server Appliance,* Technical Report 3002, Rev. C395, presented Jan. 19, 1994.

Howard, John H, et al. *Scale and Performance in a Distributed File System,* Carnegie Mellon University, CMU-ITC-87-068, Aug. 5, 1987.

Howard, John, H. et al., *Scale and performance in a distributed file system,* ACM Trans. Computer. System., 6(1), Feb. 1988 pp. 51-81.

Howard, John H., *An Overview of the Andrew File System,* Carnegie Mellon University, CMU-ITC-88-062.

*The IBM System/38,* Chapter 8, pp. 137-215.

Isomaki, Markus, *Differentiated Service for the Internet,* Department of Technical Physics and Mathematics, May 9, 1998.

Kazar, Michael L., et al., *Decorum File System Architectural Overview,* USENIX Summer Conference, Anaheim, California, 1990.

Lomet, David., et al., *The performance of a multiversion access method,* ACM SIGMOD International Conference on Management of Data, 19:353-363.

Lorie, Raymond, A, *Physical integrity in a large segmented database,* ACM Trans. Database Systems, (2)1: 91-104, Mar. 1977.

Lorie, Ra, *Shadow Page Mechanism,* IBM Technical Disclosure Bulletin, Jun. 1986, pp. 340-342.

McKusick, Marshall Kirk, et al., *A Fast File System for UNIX,* Computer Science Division, Department of Electrical Engineering and Computer Sciences, Univ. Of CA, Berkley, Feb. 18, 1994.

Miller, Ethan L., et al., *RAMA:A File System for Massively Parallel Computers,* 12$^{th}$ IEEE Symposium on Mass Storage Systems, Monterey CA, Apr. 1993, pp. 163-168.

Moons, Herman et al., *Location-Independent Object Invocation in Open Distributed Systems,* Autumn 1991 EurOpen Technical Conference and Exhibition, pp. 287-300 (Sep. 16-20, 1991).

Morris, James H., et al, *Andrew: A Distributed Personal Computing Environment,* Comm. of the ACM, vol. 29, Mar. 1986, pp. 184-201.

Mullender, Sape J., et al., *A distributed file service based on optimistic concurrency control,* ACM Symposium on Operating System Principles (Orcas Island, Washington). Published as Operating Systems Review, 19(5):51-62, Dec. 1985.

Muller, Keith, et al., *A High Performance Multi-Structured File System Design,* In Proceedings of the 13th ACM Symposium on Operating Systems Principles, Oct. 1991, pp. 56-67.

Ousterhout, John K. et al., *The Sprite Network Operating System,* Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems,* Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?,*Digital WRL Technical Note TN-11, Oct. 1989.

Ousterhout, John, *A Brief Retrospective On The Sprite Network Operating System,* found at http://www.cs.berkeley.edu/projects/sprite/retrospective.html, visited on Mar. 11, 2005.

Patterson, D., et al., *A Case for Redundant Arrays of Inexpensive Disks (RAID),*_Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID),*_SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity,* University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al, *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al, *The Design and Implementation of a Log-Structured File System,*, In Proceedings of ACM Transactions on Computer Systems, (10)1:26-52, Feb. 1992.

Sandberg, Russel et al., *Design and implementation of the Sun Network Filesystem.* In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITU Distributed File System: Principles and Design*, In Proceedings of the 10th ACM Symposium on Operating Systems Principles, (19)5:56-67, Dec. 1985.

Satyanarayanan,.M.. *A survey of distributed file systems.* Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment.* IEEE Transactions on Computers, 39(4):447-459, 1990.

Satyanarayanan, Mahadev, *Scalable, Secure, and Highly Available Distributed File Access,* Computer May 1990: 9-21.

Sidebotham, Bob, *Volumes: The Andrew File System Data Structuring Primitive,* EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System,* Computer Science Division, Department of Electrical Engineering and Computer Sciences, Univ. of CA, Berkley, Apr. 1988.

Welch, Brent B., et al., *Pseudo-File-Systems,* Computer Science Division, Department of Electrical Engineering and Computer Sciences, Univ. of CA, Berkley, Oct. 1989.

Wittle, Mark, et al, *LADDIS: The next generation in NFS file server benchmarking,* USENIX Association Conference Proceedings, Apr. 1993.

Akyurek, Sedat, *Placing Replicated Data to Reduce Seek Delays,* Department of Computer Science, University of Maryland, UMIACS-TR-91-121, CS-TR-2746, Aug. 1991.

Bitton, Dina, *Disk Shadowing,* Proceedings of the 14th VLDB Conference, LA, CA 1988.

Chaudhuri, Surajit, et al., *Self-Tuning Technology in Microsoft SQL Server,* Data Engineering Journal 22, 2 1999 pp. 20-27.

Coyne, Robert A., et al., *Storage Systems for National Information Assets,* Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager,* ACM Computing Surveys, (13)2:223-242 1981.

Hecht, Matthew S., et al. *Shadowed Management of Free Disk Pages with a Linked List,* ACM Transactions on Database Systems, 8/4, Dec. 1983, pp. 503-514.

Howard, John, H. et al., *Scale and Performance in a Distributed File System,* Carnegie Mellon University, CMU-ITC-87-068, Aug. 1987.

Howard, John H., *An Overview of the Andrew File System,* Carnegie Mellon University, CMU-ITC-88-062 1988.

Howard, John, H. et al., *Scale and Performance in a Distributed File System,* ACM Trans. Computer System, 6(1), Feb. 1988 pp. 51-81.

Kazar, Michael Leon, *Synchronization and Caching Issues in the Andrew File System,* Carnegie Mellon University, CMU-ITC-88-063.

Kazar, Michael L., et al., *DEcorum File System Architectural Overview,* USENIX Summer Conference, Anaheim, California, 1990.

Kemper, Alfons, et al., *Performance Tuning for SAP R/3,* Data Engineering Journal 22, 2 1999 pp. 33-40.

Kent, Jack et al., *Optimizing Shadow Recovery Algorithms, IEEE Transactions on Software Engineering,* 14(2): 155-168, Feb. 1988.

Kistler, et al., *Disconnected Operation in the Coda File System,* ACM Transactions on Computer Systems, vol. 10, No. 1, Feb. 1992, pp. 3-25.

Lorie, Raymond, A. *Physical Integrity in a Large Segmented Database,* ACM Trans. Database Syst., vol. 2, Mar. 1977, pp. 91-104.

Patterson, D., et al., *A Case for Redundant Arrays of Inexpensive Disks (RAID),* Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID),* SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity,* University of CA, Santa Cruz, Master's Thesis for the Department of Science in Computer Science, Sep. 2002.

Quinlan, Sean, *A Cached WORM File System,* Software-Practice and Experience, 21(12):1289-1299 1991.

Rosenblum, Mendel, et al., *The LFS Storage Manager,* Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System,* 1992 pp. 1-93.

Rosenblum, Mendel, et al., *The Design and Implementation of a Log-Structured File System,* In Proceedings of ACM Transactions on Computer Systems, (10)1:26-52, Feb. 1992.

Schiefer, Berni, et al., *DB2 Universal Database Performance Tuning,* Data Engineering Journal 22, 2 1999 pp. 12-19.

Seltzer, Margo I., et al., *Journaling Versus Soft Updates: Asynchronous Meta-Data Protection in File Systems,* Proceedings of 200 USENIX Annual Technical Conference, 6/18-23/2000.

Shasha, Dennis, *Tuning Time Series Queries in Finance: Case Studies and Recommendations,* Data Engineering Journal 22, 2 1999 pp. 41-47.

Sidebotham, Bob, *Volumes: The Andrew File System Data Structuring Primitive,* EEUG Conference Proceedings, Manchester, UK, Autumn 1986.

Subramanian, Muralidhar, et al., *Performance Challenges in Object-Relational DBMSs,* Data Engineering Journal 22, 2 1999 pp. 28-32.

Weikum, Gerhard, et al., *Towards Self-Tuning Memory Management for Data Servers,* Data Engineering Journal 22, 2 1999 pp. 3-11.

West, Michael, et al. *The ITC Distributed File System: Prototype and Experience,* Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

International Search Report for Application No. PCT/US2004/042826, Mar. 14, 2005.

Federwisch et al. "System and Method for Determining Changes in Two Snapshots and for Transmitting Changes to a Destination Snapshot", filed Jan. 20, 2006 as U.S. Appl. No. 11/336,021, 70 pages.

Lin et al. "System and Method for Transparent Data Replication over Migrating Virtual Servers", filed Apr. 24, 2007 as U.S. Appl. No. 11/739,239, 30 pages.

Chen et al. "System and Method for Supporting Asynchronous Data Replication with Very Short Update Intervals", U.S. Appl. No. 60/531,544, filed Dec. 19, 2003, 37 pages.

* cited by examiner

SYSTEM AND METHOD FOR SUPPORTING ASYNCHRONOUS DATA REPLICATION WITH VERY SHORT UPDATE INTERVALS

CROSS-REFERENCE TO RELATED APPLICATION

The present application claims the benefit of U.S. Provisional Patent Application Ser. No. 60/531,544, which was filed on Dec. 19, 2003, by Raymond C. Chen for a SYSTEM AND METHOD FOR SUPPORTING ASYNCHROUNOUS DATA REPLICATION WITH VERY SHORT UPDATE INTERVALS and is hereby incorporated by reference.

FIELD OF THE INVENTION

This invention relates to file systems and more particularly to a technique for reducing disk write operations of a file server.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a filer, implement file system semantics, such as the Data ONTAP™ storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or it's infrastructure (e.g. a flood, power outage, act of war, etc.). The mirror is updated at regular intervals, typically set by an administrator, in an effort to catch the most recent changes to the file system. One common form of update involves the use of a Snapshot™ process.

Included within the file system layer is a set of image or Snapshot™ processes (see "PCPIs" 730 in FIG. 7 below), which implement the imaging capabilities of the file system.

Snapshotting is further described in *TR3002 File System Design for an NFS File Server Appliance* by David Hitz et al., published by Network Appliance, Inc., and in U.S. Pat. No. 5,819,292 METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference. The term "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. Note that the terms "PCPI" and "Snapshot™" may be used interchangeably through out this patent without derogation of Network Appliance's trademark rights.

By way of background, a snapshot is a restorable version of a file system created at a predetermined point in time. PCPIs are generally created on some regular schedule. The PCPI is stored on-disk along with the active file system, and is called into the buffer cache of the filer memory as requested by the storage operating system. An exemplary file system data identifier buffer tree structure (using inodes in this example—but other forms of block and data identifiers can be employed) 100 is shown in FIG. 1. Over the exemplary tree structure may reside a file system information block (not shown). The root inode 105 contains information describing the inode file associated with a given file system. In this exemplary file system inode structure root inode 105 contains a pointer to the inode file indirect block 110. The inode file indirect block 110 contains a set of pointers to inode file and data blocks 115. The inode file data block 115 includes pointers to file and data blocks to 120A, 120B and 120C. Each of the file data blocks 120(A-C) is capable of storing, in the illustrative embodiment, 4 kilobytes (KB) of data. Note that this structure 100 is simplified, and that additional layers of data identifiers can be provided in the buffer tree between the data blocks and the root inode as appropriate.

When the file system generates a PCPI of a given file system, a PCPI inode 205 is generated as shown in FIG. 2. The PCPI inode 205 is, in essence, a duplicate copy of the root inode 105 of the data structure (file system) 100. Thus, the exemplary structure 200 includes the same inode file indirect block 110, inode file data block(s) 115 and file data blocks 120A-C as in FIG. 1. When a user modifies a file data block, the file system layer writes the new data block to disk and changes the active file system to point to the newly created block.

FIG. 3 shows an exemplary data structure structure 300 after a file data block has been modified. In this illustrative example, file data block 120C was modified to file data block 120C'. When file data block 120C is modified file data block 120C', the contents of the modified file data block are written to a new location on disk as a function for the exemplary file system. Because of this new location, the inode file data block 315 pointing to the revised file data block 120C must be modified to reflect the new location of the file data block 120C. Similarly, the inode file indirect block 310 must be rewritten to point to the newly revised inode file and data block. Thus, after a file data block has been modified the PCPI inode 205 contains a point to the original inode file system indirect block 110 which in turn contains a link to the inode file data block 115. This inode file data block 115 contains pointers to the original file data blocks 120A, 120B and 120C. However, the newly written inode file data block 315 includes pointers to unmodified file data blocks 120A and 120B. The inode file data block 315 also contains a pointer to the modified file data block 120C' representing the new arrangement of the active file system. A new file system root inode 305 is established representing the new structure 300. Note that metadata (not shown) stored in any Snapshotted blocks (e.g., 205, 110, and 120C) protects these blocks from being recycled or overwritten until they are released from all PCPIs. Thus, while the active file system root inode 305 points to new blocks 310, 315 and 120C', the old blocks 205, 110, 115 and 120C are retained until the PCPI is fully released.

After a PCPI has been created and file data blocks modified, the file system layer can reconstruct or "restore" the file system inode structure as it existed at the time of the snapshot by accessing the PCPI inode. By following the pointers contained in the PCPI inode 205 through the inode file indirect block 110 and inode file data block 115 to the unmodified file data blocks 120A-C, the file system layer can reconstruct the file system as it existed at the time of creation of the snapshot.

In mirroring, the above-described PCPI is transmitted as a whole, over a network (such as the well-known Internet) to the remote storage site. Generally, a PCPI is an image (typically read-only) of a file system at a point in time, which is stored on the same primary storage device as is the active file system and is accessible by users of the active file system. Note, that by "active file system" it is meant the file system to which current input/output operations are being directed. The primary storage device, e.g., a set of disks, stores the active file system, while a secondary storage, e.g. a tape drive, may be utilized to store backups of the active file system. Once Snapshotted, the active file system is reestablished, leaving the imaged version in place for possible disaster recovery. Each time a PCPI occurs, the old active file system becomes the new PCPI, and the new active file system carries on, recording any new changes. A set number of PCPIs may be retained depending upon various time-based and other criteria. The Snapshotting process is described in further detail in U.S. patent application Ser. No. 09/932,578, entitled INSTANT SNAPSHOT by Blake Lewis et al., which is hereby incorporated by reference as though fully set forth herein.

The complete recopying of the entire file system to a remote (destination) site over a network may be quite inconvenient where the size of the file system is measured in tens or hundreds of gigabytes (even terabytes). This full-backup approach to remote data mirroring or replication may severely tax the bandwidth of the network and also the processing capabilities of both the destination and source filer. One solution has been to limit the replica to only portions of a file system volume that have experienced changes. Hence, FIG. 4 shows volume-based mirroring/replication procedure where a source file system 400 is connected to a destination storage site 402 (consisting of a server and attached storage—not shown) via a network link 404. The destination 402 receives periodic mirror/replica updates at some regular interval set by an administrator. These intervals are chosen based upon a variety of criteria including available bandwidth, importance of the data, frequency of changes and overall volume size.

In brief summary, the source creates a pair of discrete time-separated PCPIs of the volume. These can be created as part of the commit process in which data is committed to non-volatile memory in the filer or by another mechanism.

The "new" PCPI 410 is a recent PCPI of the volume's active file system. The "old" PCPI 412 is an older PCPI of the volume, which should match the image of the file system mirrored/replicated on the destination mirror. Note that the file server is free to continue work on new file service requests once the new PCPI 412 is made. The new PCPI acts as a checkpoint of activity up to that time rather than an absolute representation of the then-current volume state. A differencer 420 scans the blocks 422 in the old and new PCPIs. In particular, the differencer works in a block-by-block fashion, examining the list of blocks in each PCPI to compare which blocks have been allocated. In the case of a write-anywhere system, the block is not reused as long as a PCPI references it, thus a change in data is written to a new block. Where a change is identified (denoted by a presence or absence of an 'X' designating data), a decision process 400, shown in FIG. 5, in the differencer 420 decides whether to transmit the data to the destination 402. The decision process 500 compares the old and new blocks as follows: (a) Where data is in neither an old nor new block (case 502) as in old/new block pair 430, no data is available to transfer (b) Where data is in the old block, but not the new (case 504) as in old/new block pair 432, such data has already been transferred, (and any new destination PCPI pointers will ignore it), so the new block state is not transmitted. (c) Where data is present in the both the old block and the new block (case 506) as in the old/new block pair 434, no change has occurred and the block data has already been transferred in a previous PCPI. (d) Finally, where the data is not in the old block, but is in the new block (case 508) as in old/new block pair 436, then a changed data block is transferred over the network to become part of the changed volume mirror/replica set 440 at the destination as a changed block 442. In the exemplary write-anywhere arrangement, the changed blocks are written to new, unused locations in the storage array. Once all changed blocks are written, a base file system information block, that is the root pointer of the new PCPI, is then committed to the destination. The transmitted file system information block is committed, and updates the overall destination file system by pointing to the changed block structure in the destination, and replacing the previous file system information block. The changes are at this point committed as the latest incremental update of the destination volume mirror. This file system accurately represents the "new" mirror on the source. In time a new "new" mirror is created from further incremental changes.

Approaches to volume-based remote mirroring of PCPIs are described in detail in commonly owned U.S. patent application Ser. No. 09/127,497, entitled FILE SYSTEM IMAGE TRANSFER by Steven Kleiman, et al. and U.S. patent application Ser. No. 09/426,409, entitled FILE SYSTEM IMAGE TRANSFER BETWEEN DISSIMILAR FILE SYSTEMS by Steven Kleiman, et al., both of which patents are expressly incorporated herein by reference.

This volume-based approach to incremental mirroring from a source to a remote storage destination is effective, but in some circumstances it may be desirable to replicate less than an entire volume structure. The volume-based approach typically forces an entire volume to be scanned for changes and those changes to be transmitted on a block-by-block basis. In other words, the scan focuses on blocks without regard to any underlying information about the files, inodes and data structures, which the blocks comprise. The destination is organized as a set of volumes so a direct volume-by-volume mapping is established between source and destination. Where a volume may contain a terabyte or more of information, the block-by-block approach to scanning and comparing changes may still involve significant processor overhead and associated processing time. Often, there may have been only minor changes in a sub-block beneath the root inode block being scanned. Since a list of all blocks in the volume is being examined, however, the fact that many groupings of blocks (files, inode structures, etc.) are unchanged is not considered. In addition, the increasingly large size and scope of a full volume make it highly desirable to sub-divide the data being mirrored into sub-groups such as qtrees, because some groups are more likely to undergo frequent changes, it may be desirable to update their PCPIs/Snapshots™ more often than other, less-frequently changed groups. In addition, it may be desirable to mingle original and imaged (Snapshotted) sub-groups in a single volume and migrate certain key data to remote locations without migrating an entire volume.

One such sub-organization of a volume is the well-known qtree. Qtrees, as implemented on an exemplary storage system such as described herein, are subtrees in a is volume's file system. One key feature of qtrees is that, given a particular qtree, any file or directory in the system can be quickly tested for membership in that qtree, so they serve as a good way to organize the file system into discrete data sets. The use of qtrees as a source and destination for replicated data may be desirable. An approach to remote asynchronous mirroring of a qtree is described in U.S. patent application Ser. No. 10/100,967 entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., the teachings of which are expressly incorporated herein by reference.

Because the above-described mirroring approaches are asynchronous, they occur at a point in time that may occur after the actual making of the PCPI, and may occur intermittently. This alleviates undue taxing of network bandwidth, allowing the change information to be transferred to the remote destination as bandwidth is available. A series of checkpoints and other standard transmission reference points can be established in both the source and destination to ensure that, in the event of any loss of transmission of change data across the network, the mirror update procedure can be reconstructed from the last successful transmission.

The differencer scanning procedure described above is made somewhat efficient because an unchanged block implies that all blocks beneath it are unchanged and need not be scanned. However, wherever a block is changed, the given change is typically propagated along the buffer tree up to the root, and each block in the branch must be scanned. As such, it is not uncommon that, given even a relatively small number of random writes across a tree, the entire tree must be scanned for differences (i.e. perhaps as few as $\frac{1}{1000}^{th}$ the total number of blocks). This imposes an increasingly processing large burden on the system and network as the size of volumes and related data structures increases. Currently, these volumes can approach a terabyte in size or even greater. Hence a more-efficient technique for generating a list of changed blocks for transmission to a destination mirror is desirable. This is particularly a consideration where the update interval is relatively short (one second or less, for example), requiring frequent changed block scanning and changed block transmission.

SUMMARY OF THE INVENTION

This invention overcomes the disadvantages of the prior art by providing a system and method for improving the efficiency of the transmission of updated blocks generated between two discrete point-in-time persistent consistency point images PCPIs of data identifiers in a storage operating system and repeatedly synchronizing a destination to a source without requiring the creation of new PCPIs once the source and destination have been initially synchronized. The file system records certain changes in a change log. The mirroring application selects a consistent point in the file system. The log is scanned during each update cycle (in which changes are transmitted to a destination mirror) by the storage operating system, and only changed blocks that are referenced by the file system as it exists (or existed) at the end of an update cycle are actually sent in the transmission. Scanning the log is more efficient than block differencing, particularly on short update cycles (such as one that spans one consistency point or less) of very large file systems and does not require creating a new PCPI once the source and destination have been initially synchronized. Transmitting only blocks referenced at the end of the update cycle reduces the number of changes transmitted, particularly on long update cycles where many changes may be overwritten or deleted during the update cycle. In one embodiment, the log contains a series of identifiers for blocks that include an operation (allocate or delete) and the blocks identifier. This identifier can be the block's volume block number. The log also includes markers for PCPI creation and markers for consistency points (CPs). Deleted blocks are not updated in the active map of the storage operating system until it is certain that they have been written to the mirror. In this manner they are certain to be available for use by the mirroring application.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A Network and File Server Environment

Figure 1:
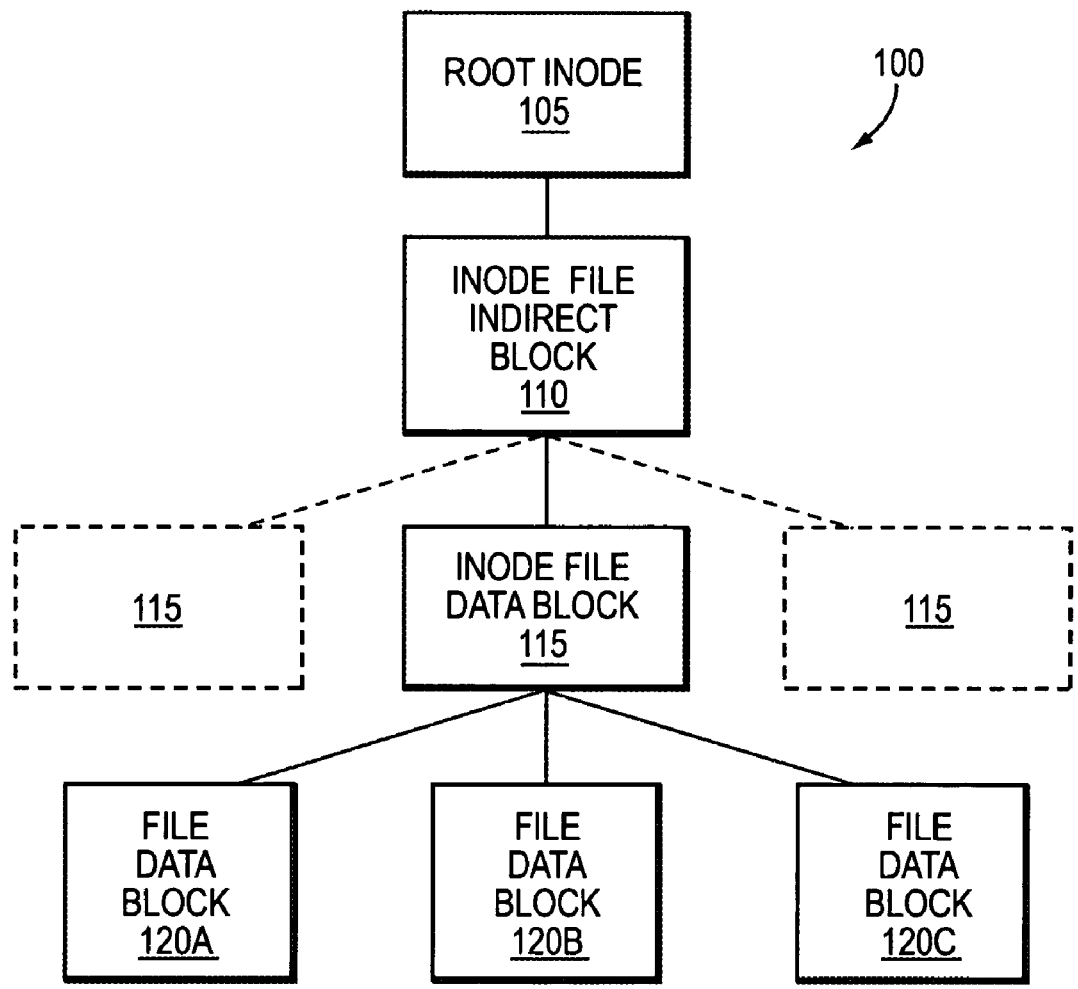
FIG. 1, already described, is schematic block diagram of an exemplary file system inode structure about to undergo a PCPI procedure according to the prior implementation.
Figure 2:
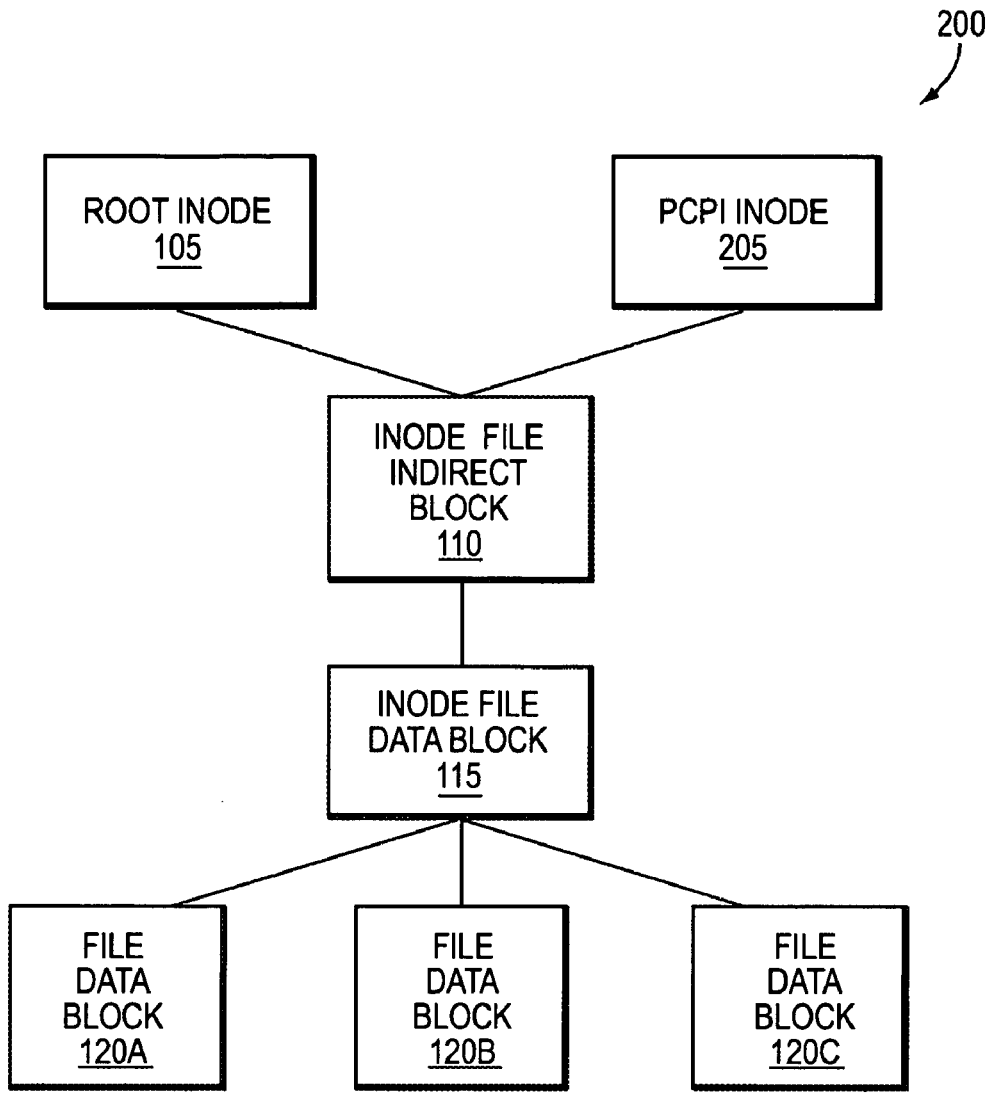
FIG. 2, already described, is a schematic block diagram of the exemplary file system inode structure of FIG. 1 including a PCPI inode, according to a prior implementation.
Figure 3:
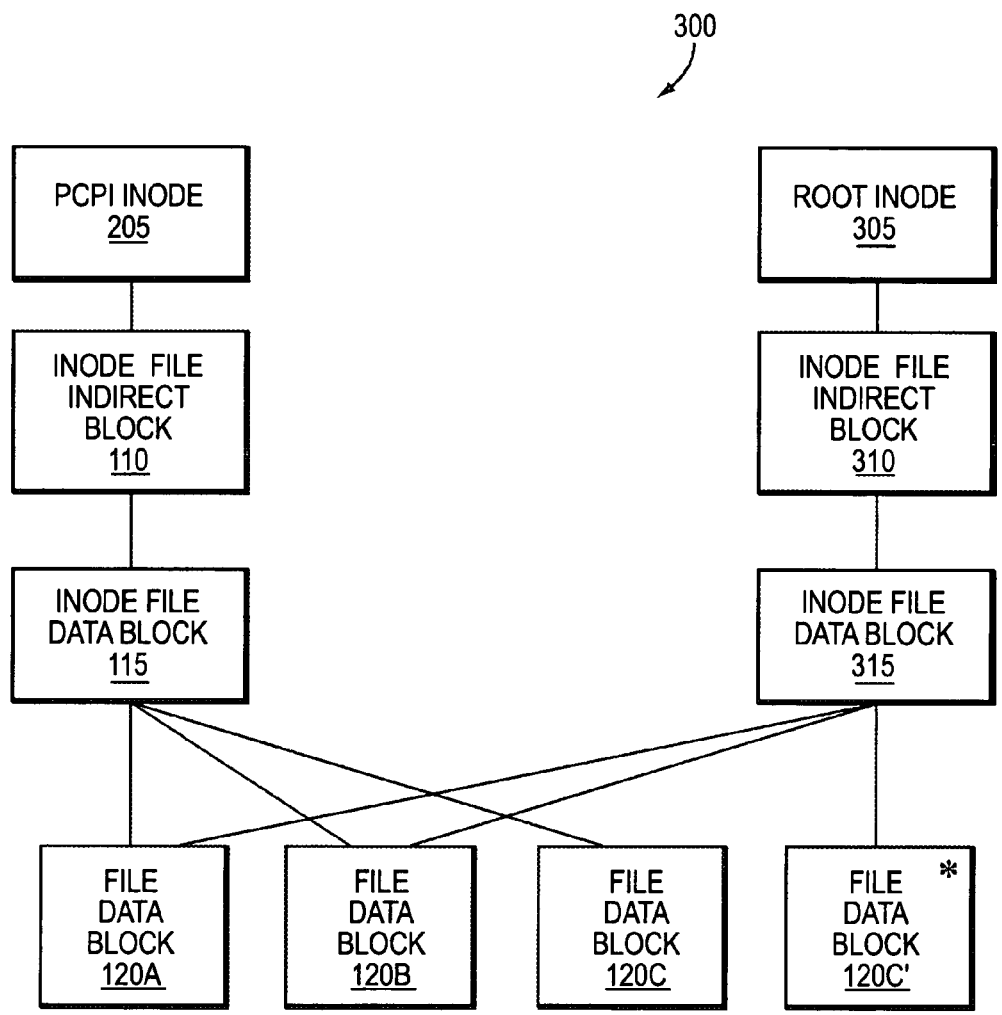
FIG. 3, already described, is a schematic block diagram of an exemplary file system inode structure of FIG. 1 after data block has been rewritten, according to a prior implementation.
Figure 4:
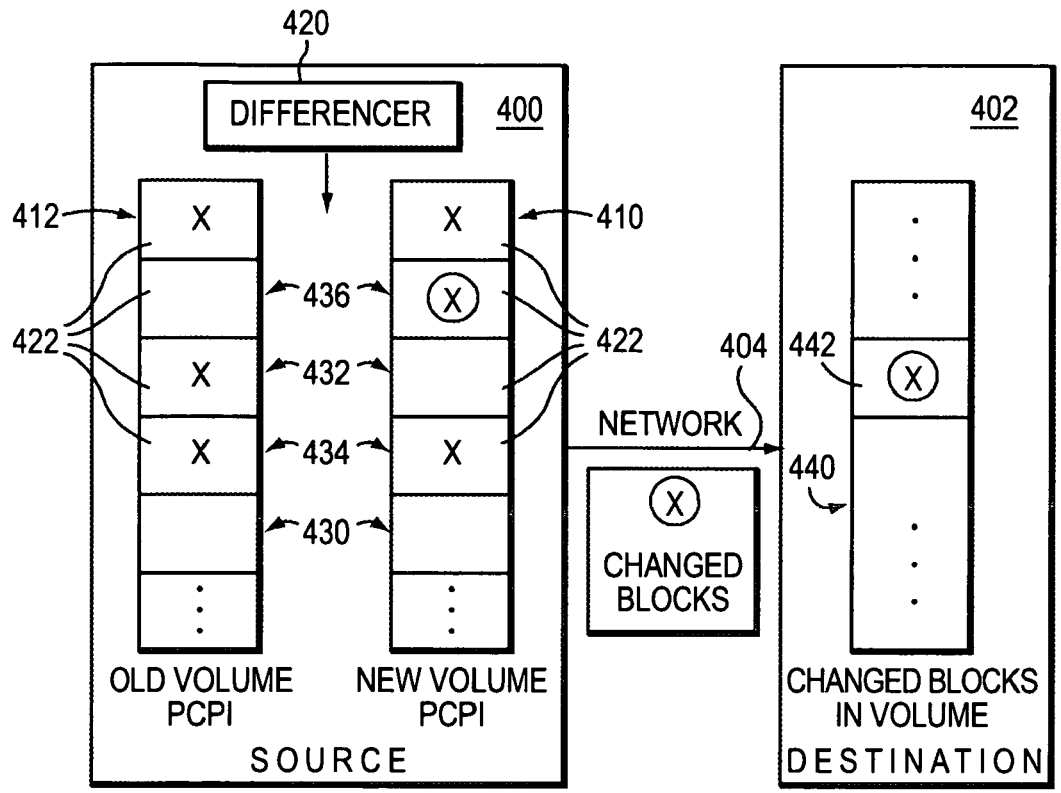
FIG. 4, already described, is a schematic block diagram of an exemplary remote mirroring of a volume file system from a source file server to a destination file server over a network according to a prior implementation.
Figure 5:
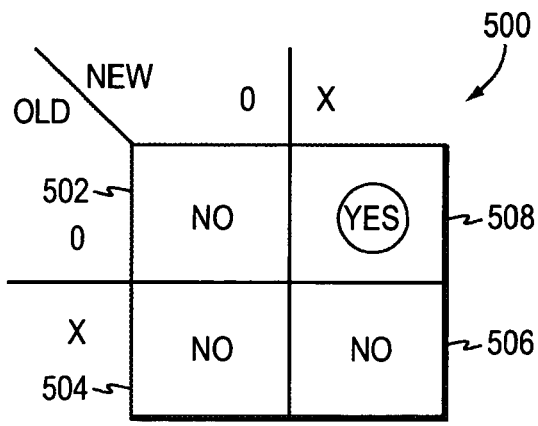
FIG. 5, already described, is a decision table used by a block differencer of FIG. 4 for determining whether a change in a block is to be transmitted from the source file server to the destination file server according to a prior implementation.
Figure 6:
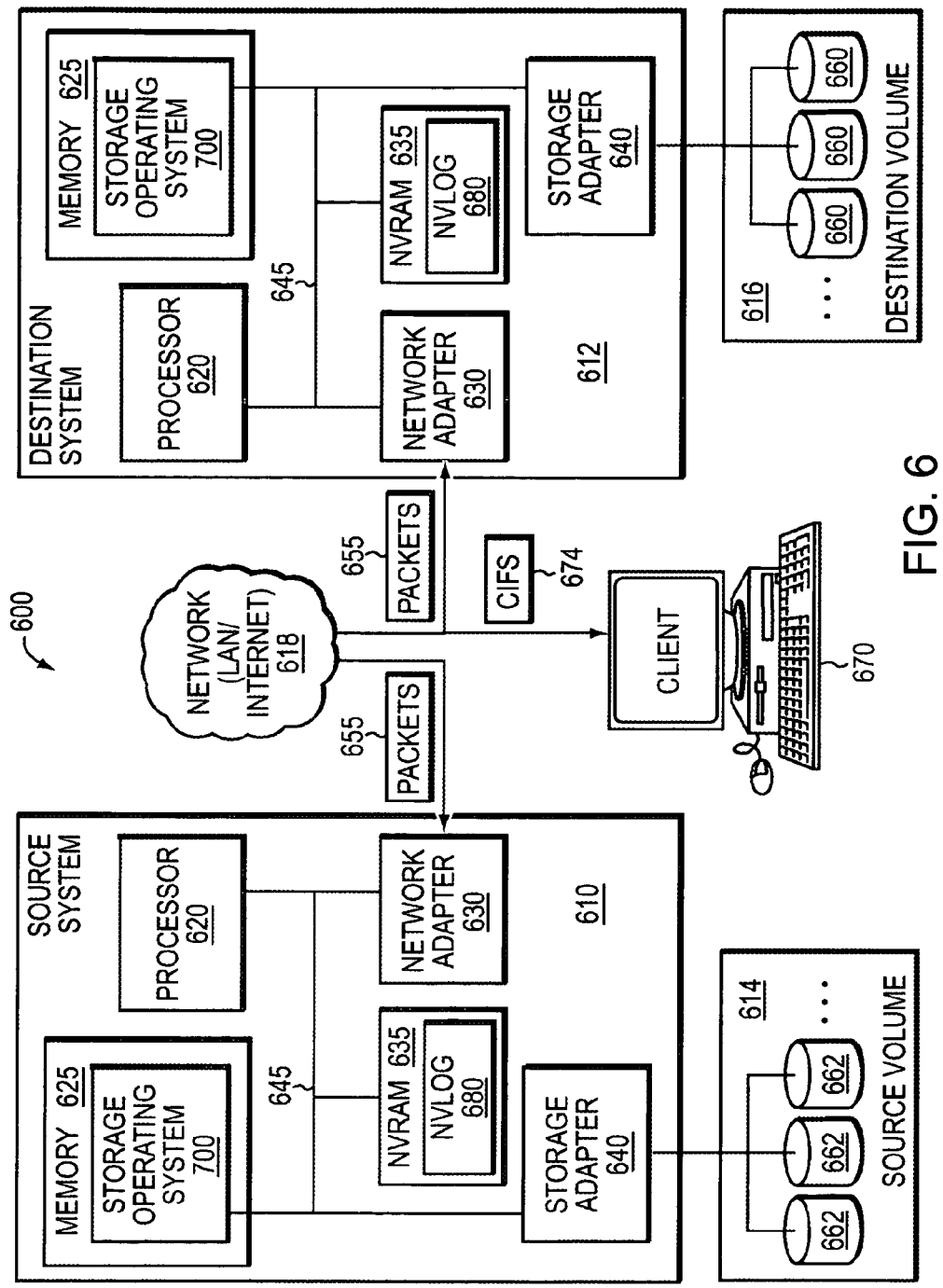
FIG. 6 is a schematic block diagram defining an exemplary network and file server environment including a source file server and a destination file server within which the principles of this invention are implemented.

By way of further background, FIG. 6 is a schematic block diagram of a storage system environment 600 that includes a pair of interconnected computers (file servers in this example) including a source system 610 and a destination system 612 that may be advantageously used with the present invention. For the purposes of this description, the source system 610 is a networked file server that manages storage one or more storage disks 662 on a source volume 614. The source system 610 executes an operating system 700. The operating system 700 implements a file system or other (for example, block-based) data structure on the disks 662 connected to the source system 610.

The destination system 612 manages one or more destination volumes 616, comprising arrays of disks 660. The source and destination are linked via a network 618 that can comprise a local or wide area network, such as the well-known Internet. An appropriate network adapter 630 residing each of the source and destination 610, 612 facilitates communication over the network 618. Note, as used herein, the term "source" can be broadly defined as a location from which the subject data of this invention travels and the term "destination" can be defined as the location to which the data travels. While a source system and a destination system, connected by a network, is a particular example of a source and destination used herein, a source and destination could be computers/filers linked via a direct link, or via loopback (a "networking" arrangement internal to a single computer for transmitting a data stream between local source and local destination), in which case the source and the destination may comprise the same file server.

In this example, both the source system 610 and destination system 612 are file servers typically comprising a processor 620, a memory 625, a network adapter 630 and a storage adapter 640 interconnected by a system bus 645. The source and destination also include a storage operating system 700 (FIG. 7) that implements a file system or other data management facility to logically organize the information as a hierarchical structure of data and data identifiers (files and directories, for example) on the disks. In this example, the storage operating systems (700) on the source and destination 610, 612 are similar, implementing similar applications and utilities. However, the source and destination operating systems can be distinct in structure and function—but both implementing the Snapshot™ and mirroring functions as described herein.

It will be understood to those skilled in the art that the inventive technique described herein may apply to any type of special-purpose computer (e.g., file serving appliance) or general-purpose computer, including a standalone computer, embodied as a storage system. To that end, the source and destination systems 610 and 612 can be broadly, and alternatively, referred to as a storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, each system memory 625 comprises storage locations that are addressable by the processor and adapters for storing software program code. The memory comprises a form of random access memory (RAM) that is generally is cleared by a power cycle or other reboot operation (i.e., it is "volatile" memory). The processor and adapters may, in turn, comprise processing elements and/or logic circuitry configured to execute the software code and manipulate the data structures. The storage operating system 700, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 630 comprises the mechanical, electrical and signaling circuitry needed to connect the system 610, 612 to the network 618, which may comprise a point-to-point connection or a shared medium, such as a local area network. Moreover the source 610 may interact with the destination filer 612 in accordance with a client/server model of information delivery. That is, the client may request the services of the filer, and the filer may return the results of the services requested by the client, by exchanging packets 655 encapsulating, e.g., the TCP/IP protocol or another network protocol format over the network 618.

Each storage adapter 640 cooperates with the operating system 700 (FIG. 7) executing on the filer to access information requested by the client. The information may be stored on the disks 662 that are attached, via the storage adapter 640 to the system 610, 612 or other node of each storage system as defined herein. The storage adapter 640 includes input/output (I/O) interface circuitry that couples to the disks over an I/O interconnect arrangement, such as a conventional high-performance, Fibre Channel serial link topology. The information is retrieved by the storage adapter and processed by the processor 620 as part of the PCPI procedure, to be described below, prior to being forwarded over the system bus 645 to the network adapter 630, where the information is formatted into a packet and transmitted to the destination server as also described in detail below.

Either system 610, 612 may also be interconnected with one or more clients 670 via the network adapter 630. The clients transmit requests for file service to the system 612 respectively, and receive responses to the requests over a LAN or other network (618). Data is transferred between the client and the filer 612 using data packets 674 defined as an encapsulation of the Common Internet File System (CIFS) protocol or another appropriate protocol, such as NFS.

In one exemplary file server implementation, each system can include a nonvolatile random access memory (NVRAM) 635 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client. The NVRAM is flushed and refilled with new request information after each successive consistency point (CP) that occurs at a regular time interval and/or after the occurrence of a critical event. If a CP does not occur due to a failure or other stoppage, then the contents of the NVRAM log 680 may be replayed to reconstruct the most recent requests.

In an illustrative embodiment, the disks 660 and 662 are arranged into a plurality of volumes (for example, destination volumes 616 and source volumes 614, respectively), in which each volume has a file system associated therewith. The volumes each include one or more disks 660. In one embodiment, the physical disks 660 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

Figure 7:
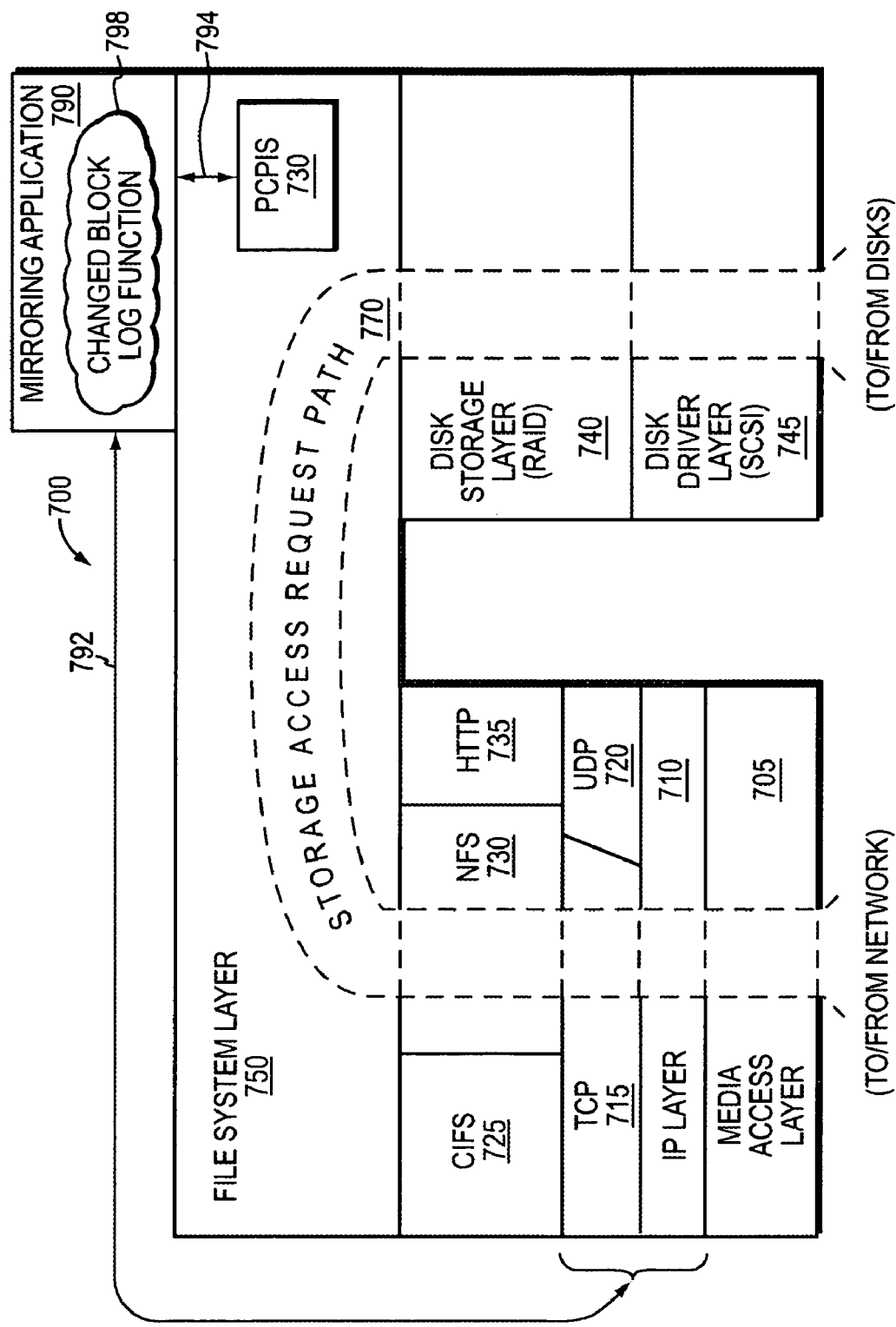
FIG. 7 is a schematic block diagram of an exemplary storage operating system for use with the file servers of FIG. 6 in accordance with an illustrative embodiment of this invention.

To facilitate generalized access to the disks 660, 662 the storage operating system 700, shown in FIG. 7, implements a write-anywhere file system or other data-handling function that logically organizes the information as a hierarchical structure of data identifiers and data (directories and files) on the disks. Each "on-disk" file may be implemented as a set of disk blocks configured to store information, such as data, whereas the directory may be implemented as a specially formatted file in which references to other files and directories are stored. As noted and defined above, in the illustrative embodiment described herein, the storage operating system is the NetApp® Data ONTAP™ operating system available from Network Appliance, Inc., of Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

The organization of the preferred storage operating system for each of the exemplary filers is now described briefly. However, it is expressly contemplated that the principles of this invention can be implemented using a variety of alternate storage operating system architectures. As shown in FIG. 7, the exemplary storage operating system 700 comprises a series of software layers, including a media access layer 705 of network drivers (e.g., an Ethernet driver). The operating system further includes network protocol layers, such as the Internet Protocol (IP) layer 710 and its supporting transport mechanisms, the Transport Control Protocol (TCP) layer 715 and the User Datagram Protocol (UDP) layer 720. A file system protocol layer provides multi-protocol data access and, to that end, includes support for the CIFS protocol 725, the NFS protocol 730 and the Hypertext Transfer Protocol (HTTP) protocol 735. In addition, the storage operating system 700 includes a disk storage layer 740 that implements a disk storage protocol, such as a RAID protocol, and a disk driver layer 745, that implements a disk control protocol such as the small computer system interface (SCSI).

Bridging the disk software layers with the network and file system protocol layers is a file system layer 750 of the storage operating system 700. Generally, the layer 750 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer server's memory 625. If the information is not in memory, the file system layer 750 indexes into the inode file using the inode number to access an appropriate entry and retrieve a volume block number. The file system layer 750 then passes the volume block number to the disk storage (RAID) layer 740, which maps that volume block number to a disk block number and sends the latter to an appropriate driver (for example, an encapsulation of SCSI implemented on a fibre channel disk interconnection) of the disk driver layer 745. The disk driver accesses the disk block number from volumes and loads the requested data in memory 625 for processing by the file server. Upon completion of the request, the filer (and storage operating system) returns a reply to the client 670.

It should be noted that the storage access data request path 770 through the storage operating system layers described above needed to perform data storage access for the client request received at the filer may alternatively be implemented in hardware or a combination of hardware and software. That is, in an alternate embodiment of the invention, the storage access request data path 670 may be implemented as logic circuitry embodied within a field programmable gate array (FPGA) or an application specific integrated circuit (ASIC). This type of hardware implementation increases the performance of the file service provided by the file server 610, 612 in response to a file system request packet 674 issued by the client 670.

Overlying the file system layer 750 is the replication/mirroring application 790. This application is responsible for the generation of updated PCPIs using the differencing function described above, and for the transmission and storage of replicated or mirrored data on the destination. In this embodiment, the snapshot mirroring application 790 operates generally outside of the storage access request path 770, as shown by the direct links 792 and 794 to the TCP/IP layers 715, 710 and the file system PCPI mechanism (730).

In accordance with an embodiment of the present invention, within the replication/mirroring application 790 is a changed block log function 798 that implements the is novel changed block logging procedure, described further below. This procedure is implemented typically on the source system 610 in this embodiment.

C. Logging of Changed Blocks

Figure 8:
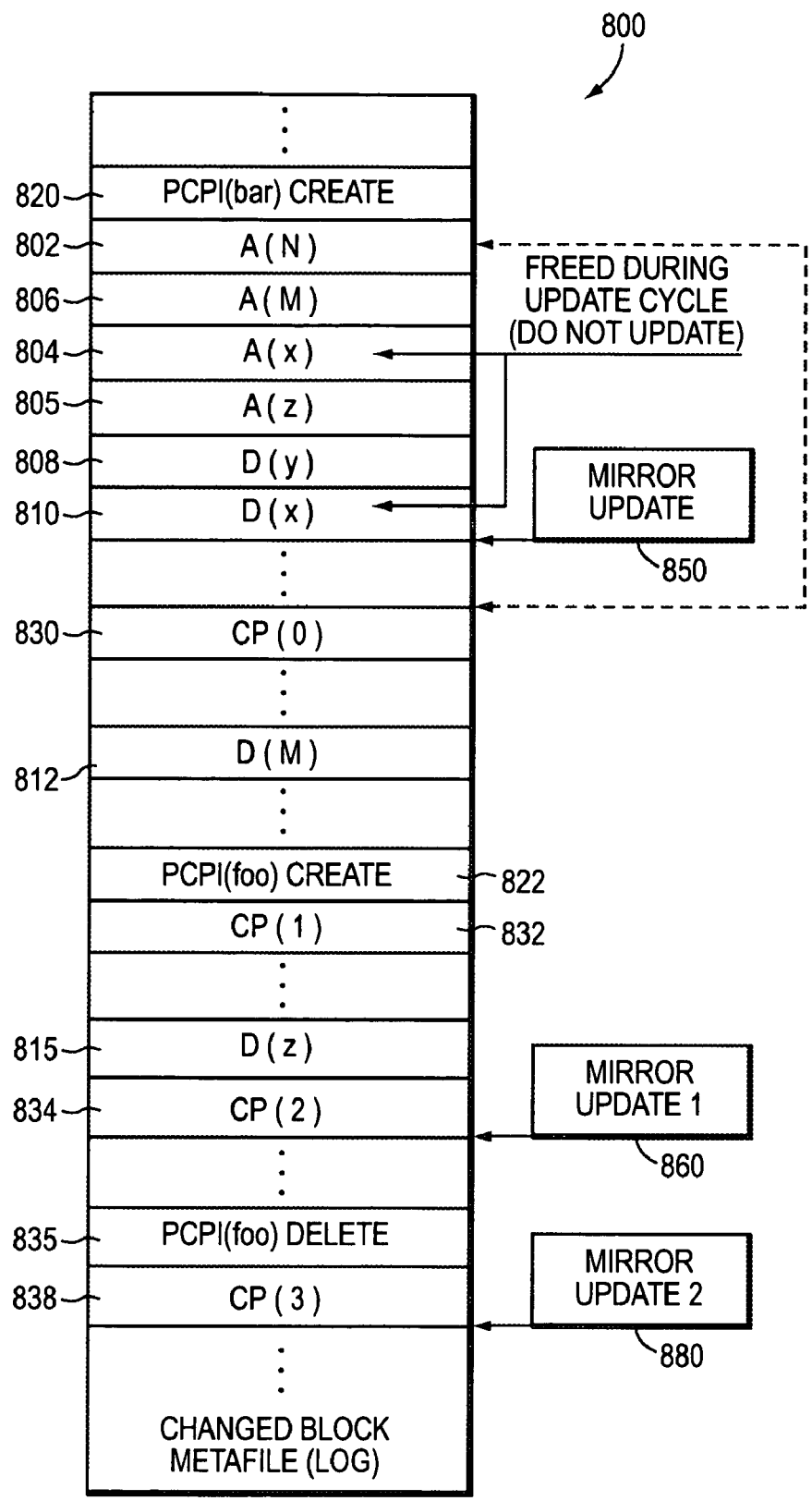
FIG. 8 is an exemplary log of changed blocks and related information for use in accordance with an illustrative embodiment of this invention.

It has been recognized that a significant quantity of changed blocks between consistency points in a file system is, in fact, metadata that is subject to great change, even during a relatively short time cycle. In other words, certain blocks may be allocated and deleted within one mirror update cycle. Where the blocks are allocated and then deleted within a cycle it is not typically necessary to include then in the update of the mirror. FIG. 8 details a densely packed persistent log 800 that continuously tracks all block allocations (designated by an "A" and the block identifier ( )) 802, 804, 805, 806 and deletions (designated by a D and the block identifier ( )) 808, 810, 812, 815. This log is established as a meta file in the operating system, that is typically invisible to users. The changes to the blocks are entered into the log, typically, in a time-ordered basis as they occur. Illustratively, all block allocations and deletions are recorded in the time order that they are visible to the rest of the system, which may not be the actual order that they occurred. Differences may occur due to, e.g., changes being made after a CP has begun being log-ordered as if the changes happened after everything in the CP. Along with each set of entries, other information, such as the creation of a given point-in-time PCPI 820, 822, the deletion of a given PCPI 835, and the occurrence of the end of a consistency point CP( ) 830, 832, 834 are also logged as they occur. Note that each PCPI creation or deletion in this embodiment occurs at the edge of a CP. Likewise the entries for changed blocks are associated with respect to a particular CP and/or PCPI based upon whether they fall within that CP/PCPI boundary. In other words, PCPI(bar) and CP(0) includes entries 802, 804, 805, 806, 808 and 810, while CP(1) also includes entry 812, etc. Note, a PCPI need not occur on each CP. Creating a PCPI on a given CP is desirable as this is a time in which the file system is "consistent."

Allocations and deletions are logged—allocations in order to determine which blocks have changed over time and deletions so that blocks are not reused until the contents of the blocks have been actually transmitted to the mirror and are certain to be no longer needed. PCPIs (Snapshots) typically are not created to prevent reuse of deleted blocks due to the performance costs associated therewith. Hence, there is a risk that deleted blocks will be reused. In this instance the file system does not mark deleted blocks as being free as it would normally do. Instead, the deletions are logged in the change log.

When the deletion has been successfully transmitted to all mirrors, then the deletion can be reflected in the active map (a metafile that indicates which blocks are allocated and which blocks are free in the file system) and the block made available for real-location/reuse.

Typically, all allocated blocks are transmitted to the mirror as these blocks are referenced by the file system. However, there are optimizations that can be made. If a set of updates is applied to the mirror and the updates include a block allocation followed by a block deletion, that block can be omitted from the transmission unless the block is referenced by a PCPI that was created after the block allocation (and therefore contains a reference to the block in question) and the PCPI still exists (has not been deleted) as of the last CP in the update cycle.

With reference to entries 804 and 810, the block X has been, respectively, allocated (A(X)) and deleted (D(X)) all within a given CP and PCPI cycle (PCPI(bar)). In other words, block X has been freed prior to the next CP and PCPI. Thus, if a mirror update 840 is transmitted (on a short cycle) before the next CP end (830), the X block can be omitted as it has been allocated and deallocated within the applicable update cycle.

With reference to entries 806 and 812, if the mirror update cycle spans the log from beginning up to and including the point referenced by mirror update 840, block M is transmitted so that the mirror is consistent with the state of the source as of CP(0) 830. However, if the mirror update cycle spans the beginning of the log up to and including the point referenced by mirror update 1860 or mirror update 2880, then block M has been dereferenced by the deletion 812, is not referenced by any PCPI that exists as of CP(2) or CP(3) and can therefore be omitted from the transmission. Note that PCPI(foo) does not include block M as PCPI(foo) is created at the end of CP(1) after block M has been deleted.

With reference to entries 805 and 815, if the mirror update cycle spans the beginning of the log up to and including the point referenced by mirror update 1 860 (CP(2)), while block z has been deleted, the deletion happened in the CP after PCPI (foo) was created. Therefore block z is present in (referenced by) PCPI (foo) and are transmitted so that the destination will have an accurate copy of PCPI (foo).

However, if the mirror update cycle spans the beginning of the log up to and including the point referenced by mirror update 2 880(CP(3)), then block z can be omitted from the transmission since PCPI(foo) was deleted prior to the end of the update cycle eliminating all references to block z. PCPI (foo) will therefore not exist when the mirror update completes so no state relevant to PCPI(foo) need be transmitted. Note that in this embodiment, the length of the mirror update cycle is determined by the mirroring application 790.

Figure 9A:
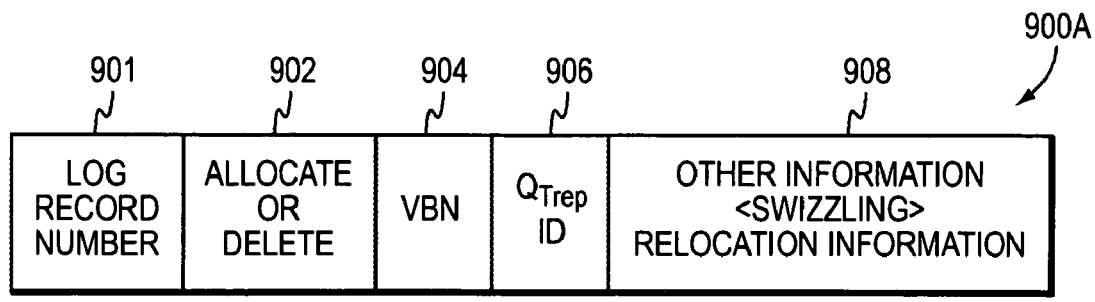
FIG. 9A is an exemplary log entry according to an embodiment of this invention.

FIG. 9A details a typical log entry 900A. This log entry consists of a log entry number 901 and an operation field (allocate block or delete block) 902. The log entry number is a unique number identifying a particular log entry. Log entry numbers are illustratively assigned in a continually increasing order to log entries as the entries are appended to the log. The blocks volume block number 904 is also provided. This identifies the particular block. Optionally, the entry can include a qtree identifier (or other sub-volume organization ID) 906. If the block is part of a qtree as described above, this identifier allows it to be associated with that qtree so that only a selected qtree's information is transmitted to the destination mirror. Likewise, an optional field for other information 908 can be provided. This information can include so called "swizzling" information related to relocation of the block where a virtual volume composed of a plurality of volume structures or other containers is employed. Entries for CPs and PCPIs can be structured in any manner that is appropriate to identification by the operating system and block change function 798.

Figure 9B:
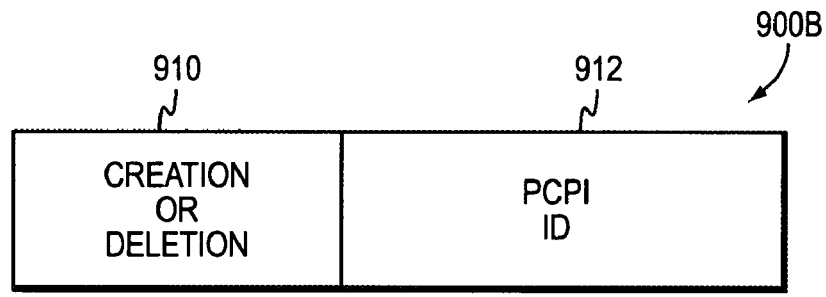
FIG. 9B is an exemplary log entry of a PCPI creation/deletion according to an embodiment of this invention.

Similar to log entry 900A, FIG. 9B is a schematic block diagram of an exemplary log entry 900B for PCPI deletions or creations. The log entry 900B includes a creation/deletion field 910 and a PCPI identifier field 912. The creation/deletion field 910 identifies whether this entry 900B is logging the creation or deletion of a PCPI. The PCPI identifier field 912 contains the PCPI ID of the PCPI being created or destroyed.

Of course, where a particular PCPI is deleted by the administrator or an automatically (by the operating system for example), the deletion is recorded in the log to enable the destination to remain in sync with the source. For example, deleting PCPI(bar) causes an entry identifying such deletion to be entered into the log.

Figure 10:
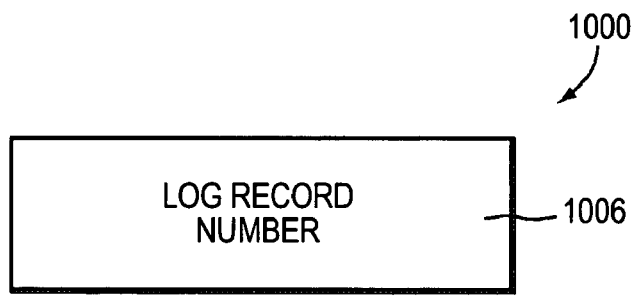
FIG. 10 is a registry entry relative to log-users in accordance with an embodiment of this invention.

Since the log is built continuously and newly deleted blocks are recorded only in the change log and not in the active map, a technique for determining where a given log user begins its use is desirable. In this manner, earlier segments of the log can be ignored by given users, thus speeding the scan of the log. Moreover, block deletions in earlier segments of the log not being used by any log user can be safely propagated to the active map, making those blocks available to the file system for reallocation/reuse. With reference to FIG. 10, each log user creates a registry entry 1005. This entry 1005 contains the log entry number of the last record in the log that was processed in the previous update cycle for the mirror. The registry entry allows the user to jump quickly to the start of the log that relates to that user. Likewise if the user is no longer concerned with the log, then the registry entry is removed from the registry. Note that, in one embodiment, the log can be deleted from a point in time earlier than the earliest registry entry once all recorded block deletions up to that point in the log have been propagated to the active map as this portion of the log is not relevant to any existing user or the active file system.

Figure 11:
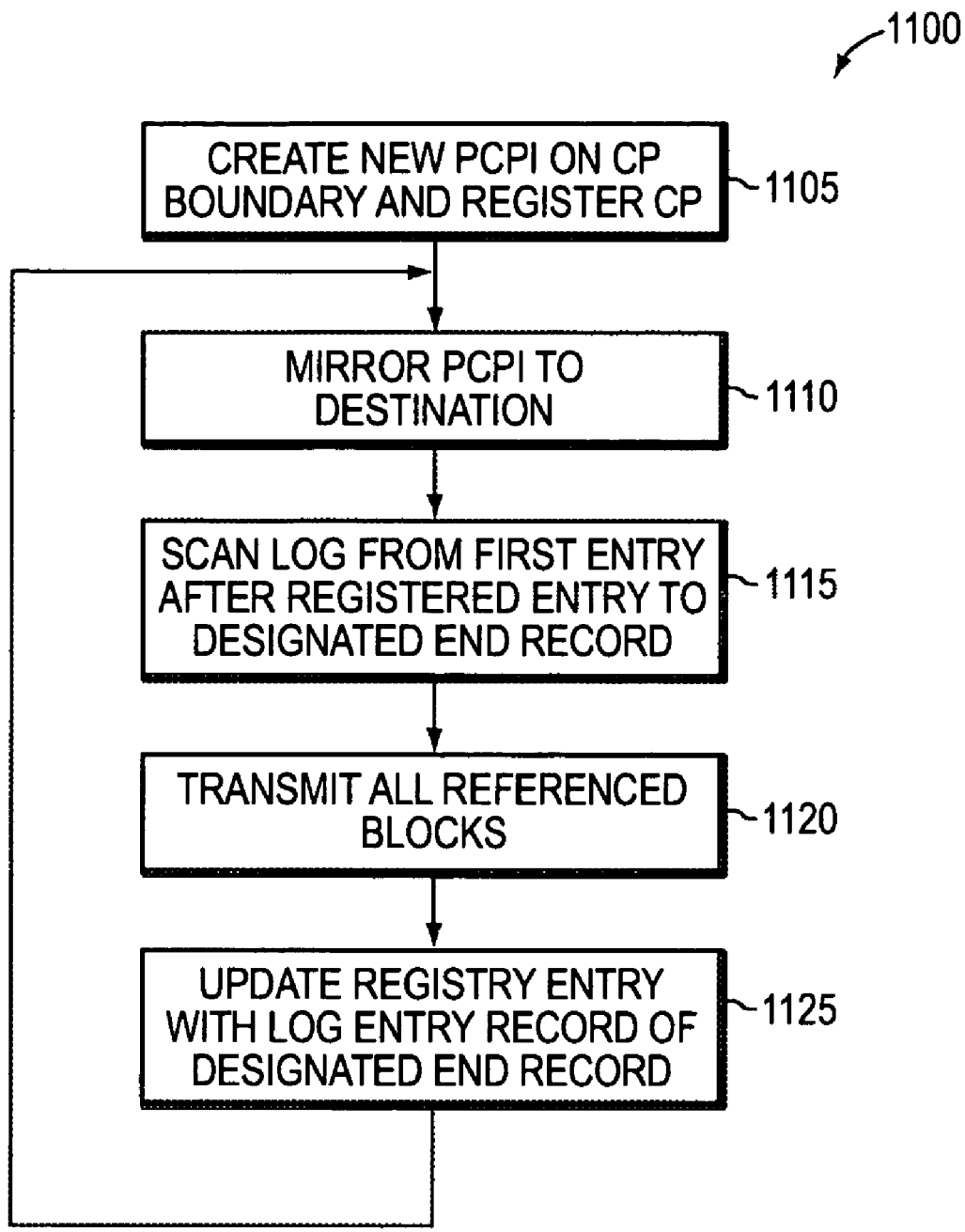
FIG. 11 is a basic flow diagram of a procedure for updating a mirror using the log in accordance with an embodiment of this invention.

FIG. 11 details a basic procedure 1100 for improving efficiency as described generally above. First, a new PCPI is created on a CP boundary and the log entry number of the CP record is registered (step 1105). From this point onwards, if the file system is not updating the change log, it starts to do so. The PCPI is then transmitted to the destination (step 1110). Techniques that can be used for this purpose include the volume-based remote PCPI mirroring techniques described in the above-reference U.S. patent application Ser. No. 09/127,497, entitled FILE SYSTEM IMAGE TRANSFER by Steven Kleiman, et al. and U.S. patent application Ser. No. 09/426,409, entitled FILE SYSTEM IMAGE TRANSFER BETWEEN DISSIMILAR FILE SYSTEMS by Steven Kleiman, et al.

Upon occurrence of a mirror update to a point in time later than that reflected by the current mirror state, the log is scanned starting from the first entry after the registered log entry and up to and including the log entry that the mirror will be updated to reflect (step 1115). The end of the update cycle is specified by the mirroring application and can be a CP boundary, a PCPI, or an arbitrary point such as the end of the log. All newly allocated blocks that are referenced by the file system and existing PCPIs as of the end of the scanned region of the log are transmitted to the mirror (step 1120). After successful transmission of the changed blocks, the registry entry is then updated so that the log entry number of the last log record scanned and updated replaces the existing log entry number (step 1125). Once all registered mirror updates have shipped a set of log records, all block deletions in those log records can be propagated to the active map and the shipped log records can then be deleted. The process repeats itself on the next mirror update cycle starting at step 1115.

Figure 12:
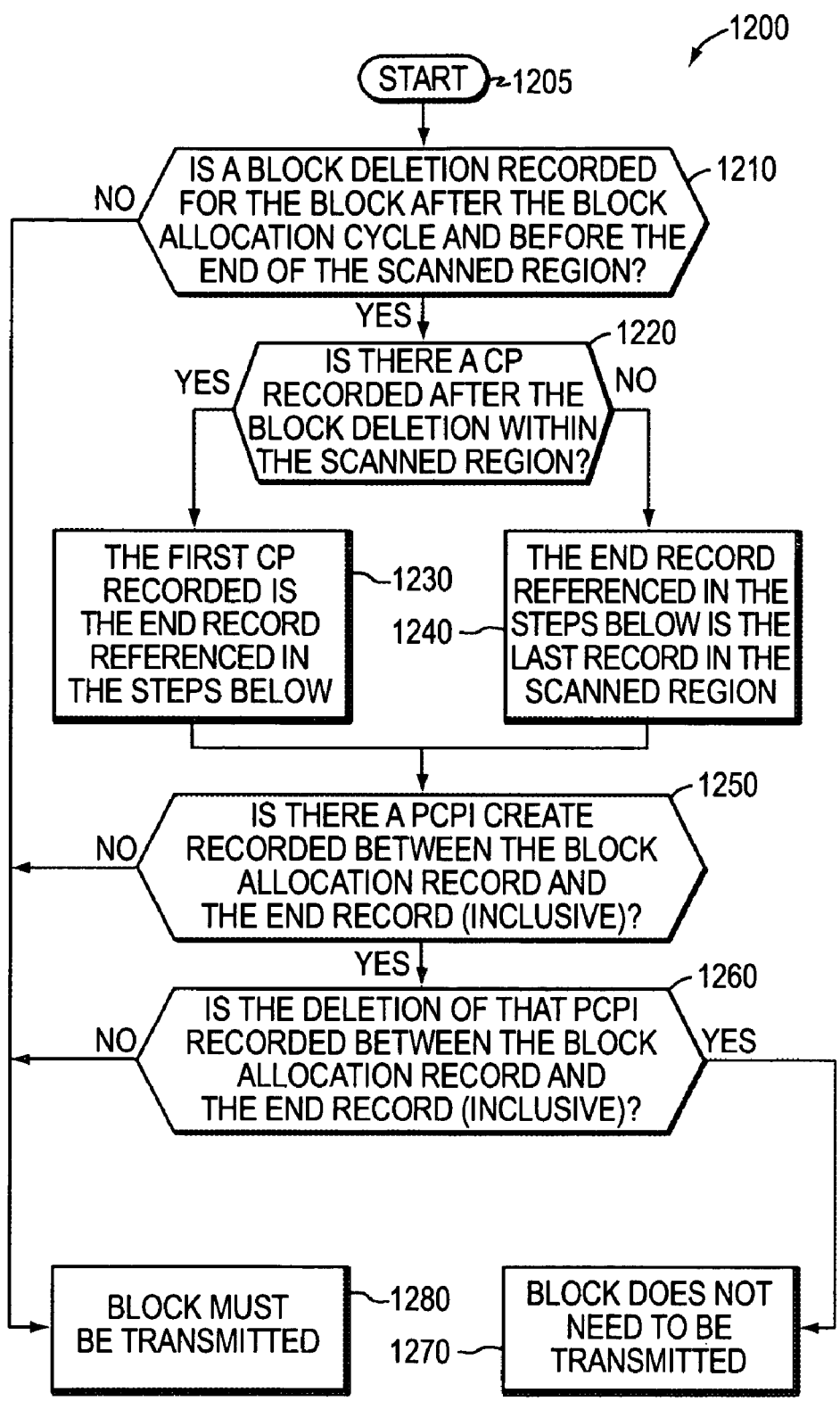
FIG. 12 is a flowchart detailing the steps of a procedure for determining whether a block is to be transmitted in accordance with an embodiment of the present invention.

To determine the set of blocks to be transmitted by step 1120, the procedure 1200 detailed in FIG. 12 is applied to each block allocation record in the scanned region of the log. The procedure begins in step 1205 and then the entries in the log after the block allocation record up to and including the last record in the scanned region of the log are examined to determine if an entry exists that records the deletion of the block (step 1210). If no record exists, then the block should be transmitted (step 1280). If a record exists, then the log is examined to identify the correct "end record" (steps 1220-1240), i.e., the record marking the end of the log region that should be examined in the remaining steps. First, it is necessary to determine the CP that the block deletion is in as PCPI creation and deletion occurs on CP boundaries. Since the log is sequentially ordered, this is the first CP recorded after the block deletion. The log is therefore examined to see if a CP is recorded after the block deletion (step 1220). If a CP is recorded in the scanned region after the block deletion, then the CP record is designated as the "end record" (step 1230). If no CP is recorded in the scanned region, then the CP has not yet finished as of the end is of the update cycle and last entry in the scanned region is designated as the "end record" (step 1240). The log is then examined to see if a PCPI create record exists between the block allocation record and the end record (step 1250). If not, then the block should be transmitted. If so, then the log records between the PCPI create and the end record are examined to see if the deletion of that PCPI was recorded in that portion of the log (step 1260). If no record exists, then the block should be transmitted (step 1280). Otherwise, the block can be omitted from transmission (step 1270).

Figure 13:
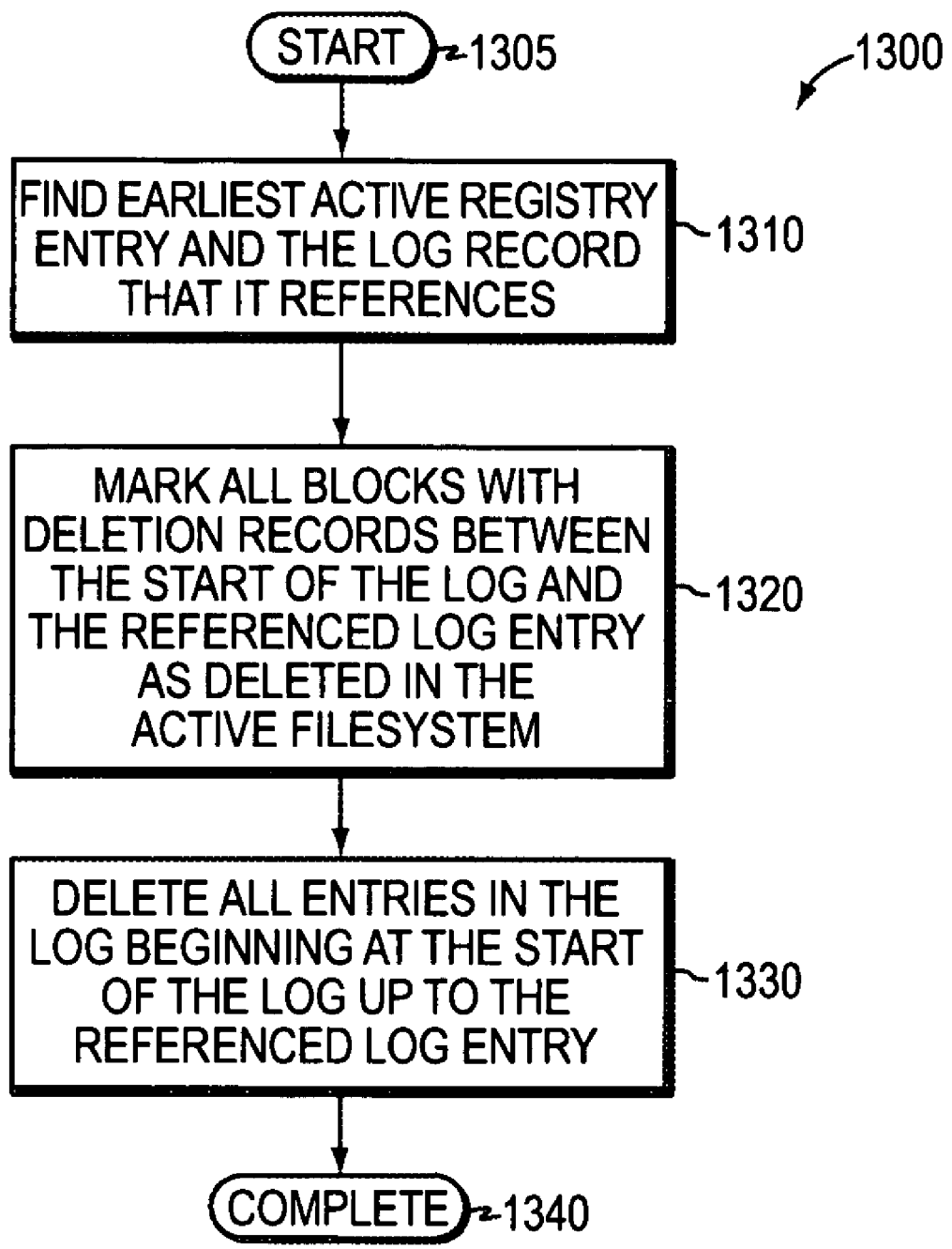
FIG. 13 is a flowchart detailing the steps of a procedure for determining when block deletions can be propagated into the active file system in accordance with an embodiment of the present invention.

FIG. 13 details the procedure used to determine when blocks deletions can be propagated to the active file system. The procedure begins in step 1305 and then all active registry entries are scanned to find the entry that references the earliest record in the log (step 1310). All block deletions recorded in the change log are then marked in the active file system as free blocks (step 1320). All entries from the beginning of the log up to but not including the log entry identified in step 1310 are then deleted (step 1330) before the procedure completes in step 1340.

Figure 14:
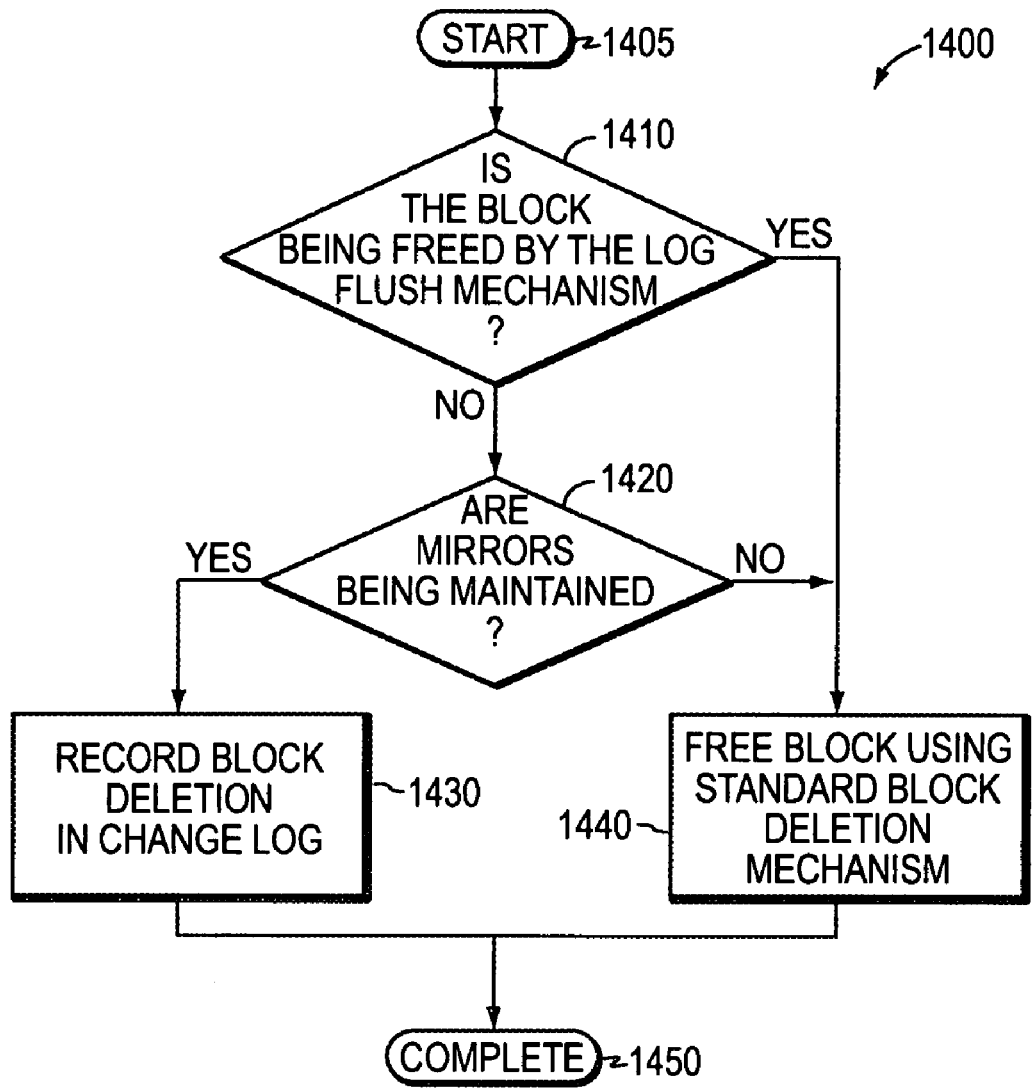
FIG. 14 is a flowchart detailing the steps of a procedure for deleting blocks in accordance with an embodiment of the present invention.

FIG. 14 details the changes required in the file system layer (step 750) when deleting blocks. Typically, when blocks are deleted, the block is marked as free (and therefore available for reuse) in the file system active map—a metafile that tracks every block in the file system and indicates whether the block is allocated or free. When mirrors are being maintained using this method, the deletion is recorded in the change log and the log flushing procedure detailed in FIG. 13 will initiate the normal block free procedures as detailed in FIG. 13. The procedure 1400 described by FIG. 14 begins in step 1405 and then the file system layer determines if the block is being marked free by the log flushing mechanism described in FIG. 13 (step 1410). If so, then the standard (pre-existing) block free mechanism is used to process the block deletion (step 1440). If not, then the system checks if the asynchronous replication method is in use (step 1420). If so, then the block deletion (free) is recorded in the change log (step 1430). If not, then the pre-existing block free mechanism is used (1440) before the procedure completes in step 1452.

In general, the logging function adheres to the following exemplary rules where the mirror is to be updated to CP(N):

1. The mirror update transfer bandwidth utilization can be optimized by not transmitting blocks that marked as allocated in the log at CP(A) that are then later marked as deleted by CP(X) where A<=X<=N unless the blocks are referenced again by a PCPI creation in CP(Y) where A<=Y<=X<=N and the PCPI is not deleted until a CP(Z) where Z>N.

2. Records in the log must form a valid sequential ordering of the operations in question. There are well known methods in the literature for arriving at serial orderings given concurrently executing operations.

3. Assuming that the current CP that the operating system is working on is CP(Z), once all entries in the log up to and including the entries for CP(N) have been transmitted to all destinations and processed, i.e., all registry entries reflect that all records for CP(N) have been processed and successfully transmitted, the deletions can be safely propagated to the active map for all entries in the log that are part of CP(X) where X<=MIN(N, Z-1).

4. If the mirror is maintained so up to date that it may be only partially behind the current CP, then blocks for all CPs can be transmitted in the log up to and including CP(N) as long as the deletions are propagated to the active map (per item 3), and as long as no log entries are removed until it is certain that the mirror has been safely updated to CP(N).

5. Finally, if we want to use the file server is a source for multiple mirrors (e.g. an N-way "fan-out"), then no entries are removed from the log, or deletions are propagated to the active map for a given CP, from the log until all mirrors are safely at the given CP or later.

The foregoing has been a detailed description of an illustrative embodiment of the invention. Various modifications and additions can be made without departing from the spirit and scope thereof. For example, this description can be applied to a variety of computer and/or file server arrangements connected by a variety of links. Also, the teachings of this invention can be implemented in a variety of manners including hardware, software, including program instructions of a computer-readable medium executing on a computer, or a combination of hardware and software. Accordingly, this description is meant to be taken only by way of example and not to otherwise limit the scope of this invention.

What is claimed is:

1. A storage system for improving efficiency of a transmission of data identifiers, comprising:
   an operating system of the storage system configured to record, in a log, entries of incremental changes of data occurring between a first persistent consistency point image (PCPI) and a second PCPI;
   a mirror update transmission cycle of the first and the second PCPI wherein one or more of the incremental changes of data occurring between the first and the second PCPI are transmitted to a destination mirror;
   a first set of one or more data identifiers in the log entries configured to reference incremental changes of data that have been allocated and then deleted between the first and the second PCPI;
   a second set of one or more data identifiers in the log entries configured to reference incremental changes of data that have not been allocated and then deleted between the first and the second PCPI;
   a processor operatively connected to the storage system configured to scan the log entries to determine the data identifiers of the first set of data identifiers and further con-figured to determine the data identifiers of the second set of data identifiers; and
   a changed data function, in response to the scan of the log, configured to omit from the transmission of the mirror update transmission cycle to the destination mirror, the data identifiers of the first set of data identifiers that have been determined by the scan of the log to have been allocated between the first and the second PCPI and then deleted between the first and the second PCPI, wherein the changed data function does not omit from the transmission of the mirror update transmission cycle to the destination mirror the data identifiers of the second set of data identifiers.

2. The storage system as set forth in claim 1 wherein the entries comprise a volume block number and an operation flag.

3. The storage system as set forth in claim 2 wherein the log is configured to omit indication of the deleted data on an active map of the storage operating system, whereby the deleted data are not inadvertently reused.

4. The storage system as set forth in claim 3 further comprising a register entry comprising one or more PCPIs that is relevant to a particular user.

5. The storage system as set forth in claim 1 wherein the log is configured to remove entries occurring prior to the first PCPI.

6. The storage system as set forth in claim 1 wherein the entries of incremental changes comprise a qtree identifier.

7. The storage system as set forth in claim 1 wherein the data comprises one or more blocks.

8. The storage system as set forth in claim 1 wherein the entries of incremental changes comprise PCPI creation times.

9. The storage system as set forth in claim 1 wherein the entries of incremental changes comprise PCPI deletion times.

10. The system as set forth in claim 1 further comprising:
    the storage system configured to determine if changed data has been referenced by a PCPI, wherein the PCPI is created after the data change;
    the storage system further configured to determine, in response to the changed data having been referenced by the PCPI, if the PCPI has been deleted as of a last consistency point in the update transmission cycle; and the changed data function further configured to omit, in response to the PCPI having been deleted, the data that was changed and subsequently deleted within the mirror update transmission cycle.

11. A method for improving efficiency of a transmission of incremental changes of data occurring between two discrete consistency points (CPs) in a storage operating system, comprising:

logging in log entries related to the incremental changes of data occurring between the two discrete CPs, wherein the incremental changes of data occur between a first persistent consistency point image (PCPI) and a second PCPI during a mirror update transmission cycle of the first PCPI and the second PCPI;

referencing a first set of one or more data identifiers in the log entries associated with changes of data that have been allocated and then deleted between the two discrete CPs, and referencing a second set of one or more data identifiers in the log entries associated with changes of data that have not been allocated and then deleted between the two discrete CPs; and scanning the log and transmitting the second set of one or more data identifiers that have been determined by the scan not to have been allocated and then deleted within an update transmission cycle that falls between the two discrete CPs, and omitting from the transmission the first set of one or more data identifiers that have been determined by the scan to have been allocated and deleted within the update transmission cycle that falls between the two discrete CPs.

12. The method as set forth in claim 11 wherein the data comprises one or more blocks.

13. The method as set forth in claim 11 wherein the entries comprise a volume block number and an operation flag.

14. The method as set forth in claim 11 further comprising omitting indication of the deleted data as deleted on an active map of the storage operating system, whereby the deleted data are not inadvertently reused.

15. The method as set forth in claim 11 further comprising providing a user with a register entry that comprises particular CPs relevant to the user and wherein the storage operating system is configured to begin a scan by the user for the particular CPs.

16. The method as set forth in claim 11 further comprising removing from the log entries occurring prior to an earliest CP of the two CPs.

17. The method as set forth in claim 11 wherein the entries comprise a qtree identifier.

18. The method as set forth in claim 11 further comprising logging in the log entries of CP creation times.

19. A computer-readable medium containing executable program instructions executed by a processor for performing a method of improving efficiency of a transmission of incremental changes of data occurring between two discrete consistency points (CPs) in a storage operating system, comprising:

program instructions that log a log entry related to changes of data occurring between the two discrete CPs, wherein the incremental changes of data occur between a first persistent consistency point image (PCPI) and a second PCPI during a mirror update transmission cycle of the first PCPI and the second PCPI;

program instructions that reference a first set of one or more data identifiers in the log associated with changes of data that have been allocated and then deleted between the two discrete CPs, and program instructions that reference a second set of one or more data identifiers in the log associated with changes of data that have not been allocated and then deleted between the two discrete CPs; and program instructions that scan the log and transmit to a destination mirror server the second set of one or more data identifiers that have been determined by the scan not to have been allocated and then deleted within an update transmission cycle that falls between the two discrete CPs, and omitting from the transmission the first set of one or more data identifiers that have been determined by the scan to have been allocated and deleted within the update transmission cycle that falls between the two discrete CPs.

20. The computer-readable medium as set forth in claim 19 wherein the entries comprise a volume block number and an operation flag.

21. The computer-readable medium as set forth in claim 19 further comprising program instructions that omit indication of the deleted data as deleted on an active map of the storage operating system, whereby the deleted data are not inadvertently reused.

22. The computer-readable medium as set forth in claim 19 further comprising program instructions that begin a scan at a particular CP specified by a user.

23. The computer-readable medium as set forth in claim 19 further comprising removing from the log entries occurring prior to an earliest first CP of the two discrete CPs.

24. The computer-readable medium as set forth in claim 19 wherein the entries comprise a qtree identifier.

25. A method for improving efficiency of a transmission of incremental changes of data occurring between two discrete consistency points, comprising:

transferring a set of changed data to a log as entries that indicate with a first identifier which data has been allocated and then deleted between the two discrete consistency points and indicate with a second identifier which data has not been allocated and then deleted between the two discrete consistency points, wherein the incremental changes of data occur between a first persistent consistency point image (PCPI) and a second PCPI during a mirror update transmission cycle of the first PCPI and the second PCPI, and wherein the allocation and deletion occur during a particular update transmission cycle; and selectively transmitting to a destination replica the data indicated with the second identifier in the log to not have been allocated and then deleted between the two discrete consistency points, and selectively omitting from the selective transmission to the destination replica the data indicated with the first identifier in the log to have been allocated and then deleted between the two discrete consistency points.

26. The method of claim 25, wherein the data comprises one or more blocks.

27. A storage system for improving efficiency of a transmission of data identifiers, comprising:

a processor operatively connected to a source server configured to execute a storage operating system, wherein the storage operating system is configured to record, in a log, incremental changes of data that occur between two discrete consistency points, wherein the incremental changes of data occur between a first persistent consistency point image (PCPI) and a second PCPI during a mirror update transmission cycle of the first PCPI and the second PCPI;

a first set of one or more data identifiers in the log configured to reference incremental changes of data that have been allocated and then deleted between the two discrete consistency points;

a second set of one or more data identifiers in the log configured to reference incremental changes of data that have not been allocated and then deleted between the two discrete consistency points;

a changed data function configured to transmit, to a destination device, the incremental changes of data referenced by the second set of one or more data identifiers in the log that have not been allocated and then deleted between the two discrete consistency points; and the changed data function further configured to omit from the transmission to the destination device the incremental changes of data referenced by the first set of one or more data identifiers in the log that have been allocated and then deleted between the two discrete consistency points.

28. A method for improving efficiency of a transmission of incremental changes occurring between two discrete consistency points (CPs), comprising:

logging in log entries related to the incremental changes of data occurring between the two discrete CPs, wherein the incremental changes of data occur between a first persistent consistency point image (PCPI) and a second PCPI during a mirror update transmission cycle of the first PCPI and the second PCPI, and wherein at least one of the log entries comprises a first data identifier configured to reference a change of data that has been allocated and then deleted between the two CPs, and wherein at least one of the log entries comprises a second data identifier configured to reference a change of data that has not been allocated and then deleted between the two CPs;

scanning the log and transmitting to a destination mirror the change of data referenced by the second data identifier that has not been allocated and then deleted between the two CPs; and omitting from the transmission to the destination mirror the change of data referenced by the first data identifier that has been allocated and then deleted between the two CPs.

29. A computer-readable medium containing executable program instructions executed by a processor for performing a method of improving efficiency of a transmission of incremental changes of data occurring between two discrete consistency points (CPs), comprising:

program instructions that log in log entries related to the incremental changes of data occurring between the two discrete CPs, wherein at least one of the log entries comprises a first data identifier configured to reference a change of data that has been allocated and then deleted between the two CPs, wherein the incremental changes of data occur between a first persistent consistency point image (PCPI) and a second PCPI during a mirror update transmission cycle of the first PCPI and the second PCPI, and wherein at least one of the log entries comprises a second data identifier configured to reference a change of data that has not been allocated and then deleted between the two CPs;

program instructions that scan the log and transmit to a destination mirror the change of data referenced by the second data identifier that has not been allocated and then deleted between the two CPs; and program instructions that scan the log and omit from the transmission to the destination mirror the change of data referenced by the first data identifier that has been allocated and then deleted between the two CPs.

30. A computer-readable medium containing executable program instructions executed by a processor for performing a method of improving efficiency of transmission of incremental changes of data occurring between two discrete consistency points, comprising:

program instructions that transfer a set of changed blocks to a log as entries that indicate with a first identifier that a block has been allocated and then deleted between the two discrete consistency points and indicate with a second identifier that a block has not been allocated and then deleted between the two discrete consistency points, wherein the incremental changes of data occur between a first persistent consistency point image (PCPI) and a second PCPI during a mirror update transmission cycle of the first PCPI and the second PCPI; and program instructions that selectively transmit to a destination replica the block indicated with the second identifier in the log to not have been allocated and then deleted between the two discrete consistency points, and program instructions that selectively omit from the selective transmission to the destination replica the block indicated with the first identifiers in the log to have been allocated and then deleted between the two discrete consistency points.

31. A method for improving efficiency of a transmission of incremental changes of data occurring between two discrete consistency points, comprising:

recording record entries of the incremental changes of data in a log that occur between two discrete consistency points, wherein the incremental changes of data occur between a first persistent consistency point image (PCPI) and a second PCPI during a mirror update transmission cycle of the first PCPI and the second PCPI;

determining which incremental data was allocated and deallocated between the two discrete consistency points, wherein the incremental data that was allocated and deallocated between the two discrete consistency points are associated with a first identifier, and wherein incremental data that was not allocated and deallocated between the two discrete consistency points are associated with a second identifier;

identifying the incremental data that was allocated and deallocated between the discrete two consistency points by the first data identifier and identifying the incremental data that was not allocated and deallocated between the two discrete consistency points by the second data identifier;

omitting from a transmission to a destination server the incremental data that was allocated and deallocated between the two discrete consistency points; and transmitting, through the transmission to the destination server, the incremental data that was not allocated and deallocated between the two discrete consistency points.

32. A computer implemented method for improving efficiency of a transmission of incremental changes of data occurring between two discrete consistency points, comprising:

recording, in a plurality of log entries stored on a storage system, a plurality of block changes and deletions occurring within a plurality of update transmission cycles;

recording a block change of a first block occurring within a particular update transmission cycle and recording a subsequent deletion of the first block occurring within the particular update transmission cycle;

associating the first block with an identifier that indicates the first block has changed within the particular update transmission cycle and then subsequently has been deleted within the particular update transmission cycle;

determining if the first block has been referenced by a persistent consistency point image, wherein the persistent consistency point image is created after the first block change;

determining, in response to the first block having been referenced by the persistent consistency point image, if the persistent consistency point image has been deleted as of a last consistency point in the particular update transmission cycle; and omitting, in response to the persistent consistency point image having been deleted, the first block that was changed and subsequently deleted within the particular update transmission cycle, wherein the first block that was changed and subsequently deleted within the particular update transmission cycle is identified to be omitted by the identifier, and wherein the omission is from a transmission to memory.

33. The computer implemented method of claim 32 further comprising transmitting the first block in response to determining the persistent consistency point image has not been deleted.

34. The computer implemented method of claim 32 further comprising omitting, in response to determining that the first block has not been referenced by the persistent consistency point image, the first block from the transmission to the memory.

35. A method for improving efficiency of a transmission of incremental changes of data occurring between two discrete consistency points (CPs) in a storage operating system, comprising:

receiving a plurality of I/O commands comprising an allocation command and a delete command to delete an already allocated block, wherein the plurality of commands are received between the two discrete CPs;

recording the allocation command and the delete command in a log;

logging in the log entries related to the incremental changes of data occurring between the two discrete CPs, wherein the incremental changes of data occur between a first persistent consistency point image (PCPI) and a second PCPI during a mirror update transmission cycle of the first PCPI and the second PCPI;

scanning the log to identify, by a first identifier, a first group of one or more blocks that have been allocated and not deleted between the two discrete CPs;

identifying, by a second identifier, a second group of one or more blocks that were allocated and also deleted between the two discrete CPs; and omitting from a transmission to a destination computer the second group of one or more blocks identified by the second identifier, wherein the transmission does not omit the first group of blocks identified by the first identifier.

* * * * *